Figure 1:
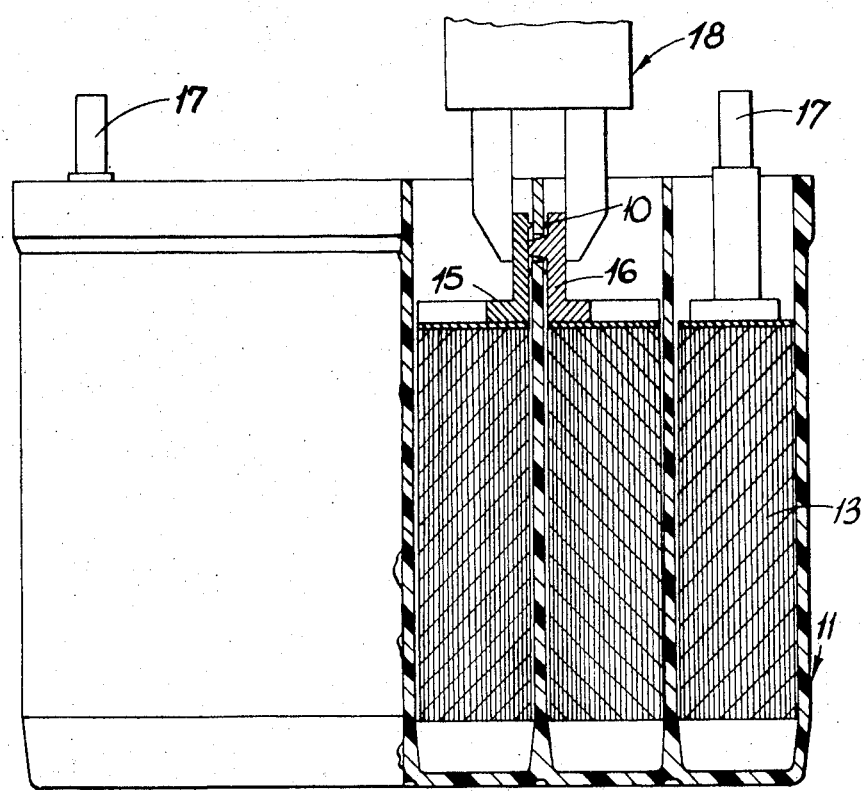

United States Patent [19]
Blandford, deceased et al.

[11] 3,793,087
[45] Feb. 19, 1974

[54] METHOD FOR PRODUCING A SLEEVE EXTENDING THROUGH AN APERTURE IN THE BATTERY LID AND SECURING THE TERMINAL POST TO THE SLEEVE

[75] Inventors: Kenneth George Blandford, deceased, late of Solihull, England; Joyce Margaret Blandford, administratrix, Solihull, England

[73] Assignee: Joseph Lucas (Industries) Limited, Birmingham, England

[22] Filed: June 7, 1972

[21] Appl. No.: 260,591

Related U.S. Application Data

[62] Division of Ser. No. 862,321, Sept. 30, 1969, abandoned.

[30] Foreign Application Priority Data
Oct. 11, 1968  Great Britain .................... 48293/68
Jan. 27, 1969  Great Britain ...................... 4418/69

[52] U.S. Cl. ................................. 136/168, 136/170
[51] Int. Cl. ............................................. H01m 1/02
[58] Field of Search ... 136/134, 135, 168, 176, 170, 136/175, 133

[56] References Cited
UNITED STATES PATENTS
3,285,785   11/1966   Shannon ............................ 136/168
2,415,694   2/1947    Isabell et al. ..................... 136/134 R
3,113,892   12/1963   Albrecht ............................ 136/168
3,476,611   11/1969   Sabatino ......................... 136/134 R
3,522,105   7/1970    Sabatino ............................ 136/168

Primary Examiner—Anthony Skapars
Attorney, Agent, or Firm—Holman & Stern

[57] ABSTRACT

To manufacture an electric storage battery of the kind including a battery box divided into a plurality of compartments, a lid closing the battery box, an assembly of battery plates and separators within each compartment, means interconnecting plates within adjacent compartments so that the assemblies within the compartments are connected in series, and a pair of posts extending upwardly from the assemblies in the end compartments through apertures in the lid, a pair of sleeve parts are first located in position relative to each aperture in the lid so that the sleeve parts extend into their respective aperture. Each pair of sleeve parts are then secured together by resistance welding to produce a sleeve extending through each aperture in the lid, whereafter the posts are secured to the sleeves respectively.

14 Claims, 3 Drawing Figures

PATENTED FEB 19 1974  3,793,087

METHOD FOR PRODUCING A SLEEVE EXTENDING THROUGH AN APERTURE IN THE BATTERY LID AND SECURING THE TERMINAL POST TO THE SLEEVE

This invention relates to electric storage batteries, particularly lead-acid batteries and is a divisional application from Ser. No. 862321 filed Sept., 1969 and now abandoned.

The invention resides in a method of manufacturing an electric storage battery of the kind including a battery box divided into a plurality of compartments, a lid closing the battery box, an assembly of battery plates and separators within each compartment, means interconnecting plates within adjacent compartments so that the assemblies within the compartments are connected in series, and a pair of posts extending upwardly from the assemblies in the end compartments through apertures in the lid, the method comprising the steps of locating a pair of sleeve parts in position relative to each aperture in the lid so that the sleeve parts extend into their respective aperture, securing each pair of sleeve parts together by resistance welding to produce a sleeve extending through each aperture in the lid, and securing the posts to the sleeves respectively.

Figure 2:
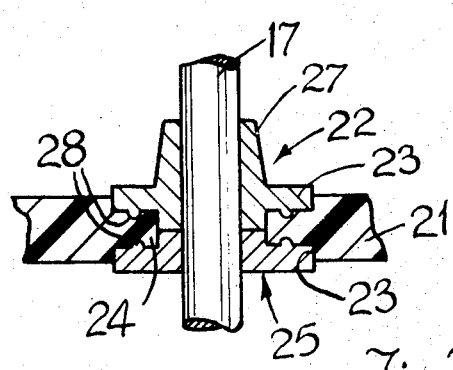
Figure 3:
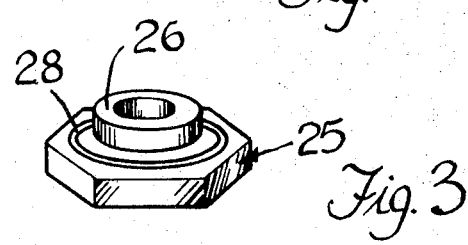

An example of the invention is illustrated in the accompanying drawings, in which:

FIG. 1 is a part-sectional view of part of a battery during the manufacture thereof, in accordance with one example of the invention, FIG. 2 shows part of the lid, and FIG. 3 shows one of the parts used in forming the sleeve in the lid.

Referring to the drawing, a battery box 11, conveniently formed from polypropylene, includes partition walls dividing the box into a plurality of compartments 13. Within each compartment 13 is an assembly of battery plates and separators, the required intercell connections being made by securing the appropriate plates in one cell to a connector 15 having an upstanding portion 16 which is connected to a similar connector in the adjacent cell by resistance welding using an electrode 18. Integral sealing rings 10 are provided on the upstanding portions 16 to improve the seal.

In addition, the appropriate battery plates in the end compartments are connected to a pair of upstanding posts 17.

The lid 21 of the battery is also moulded in polypropylene and is secured to the battery box, with ribs (not shown) on the lid engaged with and being secured to the tops of the partition walls, and a pair of apertures in the lid accommodating the pair of upstanding posts 17 respectively, each aperture having a shoulder 24 which projects into the aperture and divides the aperture into upper and lower hexagonal recesses 23 on opposite sides respectively of the shoulder 24. However, before securing the lid to the battery box, a pair of hollow sleeves 22 are secured to the lid to provide means for securing the posts 17 in position. For this purpose, a hexagonal nut 25 having an upwardly extending cylindrical portion 26 is engaged with the lower recess 23 with the portion 26 extending into the hole defined by the shoulder 24, and engaged with the upper recess 23 is a similar part which incorporates an axially extending flange 27. The two parts are interconnected by resistance welding using a removable former of polished stainless steel to prevent flow of material inwardly. In this way, the sleeve is secured relative to the lid, so that when the lid is secured to the battery box the post 17 will extend upwardly through the sleeves, and can then be secured thereto in any convenient manner, for example by melting the top of the post, to seal the battery and form the required terminals. The removable former may be slightly tapered to assist in its removal after the weld has been effected.

The face of the hexagonal nut 25 which is presented to the projecting shoulder 24 has integral sealing rings 28 which are pushed into the thermoplastic lid during the welding to improve the seal. The sealing rings 28 could alternatively be moulded integrally with each of the faces of the shoulders 24 which are to be presented to the hexagonal nuts 25 respectively. It will be appreciated that other means may be employed to prevent rotation of the post relative to the lid, wherein the hexagonal nuts and recesses may take other non-circular forms.

In a further example of the invention faces of each of the projecting shoulders 24 defining the apertures in the lid 21 are moulded with longitudinal splines of triangular section around which material flows during the resistance welding operation, thereby assisting the key. Where this arrangement is used, the lower recesses can still be hexagonal, but it could be circular, in which case the nuts engaging the lower recesses would of course be circular.

In a modification of the example cited above the faces of one or each of the nuts 25 which engage the recesses 23 are inclined outwardly in such a way that the peripheral thickness of the nut is greater than the central thickness thereof. In this way, the resistance welding of the nuts 25 to the lid 21 produces an improved seal of the resultant sleeve 22 to the lid.

We claim:

1. A method of manufacturing an electric storage battery of the kind including a battery box divided into a plurality of compartments, a lid closing the battery box, an assembly of battery plates and separators within each compartment, means interconnecting plates within adjacent compartments so that the assemblies within the compartments are connected in series, and a pair of posts extending upwardly from the assemblies in the end compartments through apertures in the lid, the method comprising the steps of locating a pair of sleeve parts in position relative to each aperture in the lid so that the sleeve parts extend into their respective aperture, securing each pair of sleeve parts together by resistance welding to produce a sleeve extending through each aperture in the lid, and securing the posts to the sleeves respectively.

2. A method as claimed in claim 1 wherein a removable former is received within each pair of sleeves during the resistance welding.

3. A method as claimed in claim 1 wherein the wall of each aperture in the lid is formed with an integral projecting shoulder, each shoulder dividing its aperture into an upper and a lower recess on opposite sides of said shoulder respectively and each pair of sleeve parts are located in the upper and lower recesses respectively of its respective aperture.

4. A method as claimed in claim 3 wherein each shoulder has an inwardly directed face formed with integral longitudinal splines around which material from the respective pair of sleeve parts flows during the resistance welding to enhance the key between the shoulder and the sleeve parts.

5. A method as claimed in claim 3 wherein each of said sleeve parts is formed with an integral sealing ring which is pushed into the shoulder of the respective aperture when the sleeve parts are resistance welded together to produce the sleeve extending through the aperture.

6. A method as claimed in claim 3 wherein each shoulder is formed on a pair of opposite faces with respective integral sealing rings, the sealing rings engaging the sleeve parts when the sleeve parts are engaged in their respective recesses.

7. A method as claimed in claim 3 wherein said recesses are of non-circular cross-section.

8. A method as claimed in claim 7 wherein the upper and lower parts constituting each sleeve are in the form of first and second non-circular nuts respectively, the nuts being complementary with their respective recesses and each first nut having an upwardly extending axial flange which protrudes from the top of said lid when the nut is engaged in its respective upper recess and each second nut having an upwardly extending cylindrical portion which, when the nut is received in the lower recess of its respective aperture, extends into the region of the aperture defined within the shoulder to engage its associated upper sleeve part.

9. A method as claimed in claim 8 wherein each first nut has a downwardly extending cylindrical portion which projects into the region of its respective aperture defined within the shoulder to engage the upwardly extending cylindrical portion of its associated second nut when the nuts are located in their respective recesses.

10. A method as claimed in claim 8 wherein at least one of the nuts has the face thereof which is to be presented to its respective recess inclined outwardly so that the thickness of the nut at the periphery thereof is greater than the thickness of the nut adjacent the centre thereof.

11. A method as claimed in claim 4 wherein each upper recess is of non-circular cross-section and each lower recess is of circular cross-section.

12. A method as claimed in claim 11 wherein the upper part of each of said sleeves is engaged in a respective upper recess and comprises a non-circular nut having an upwardly extending axial flange which then protrudes from the top of said lid, and wherein the lower part of each of said sleeves is engaged in a respective lower recess and comprises a circular nut having an upwardly extending cylindrical portion which then extends into the region of its respective aperture defined within the shoulder so as to engage its associated upper sleeve part.

13. A method as claimed in claim 12 wherein the upper part of each of said sleeves also comprises a downwardly extending cylindrical portion which projects into the region of its respective aperture defined within the shoulder to engage the upwardly extending cylindrical portion of its associated lower sleeve when the parts are engaged in their respective recesses.

14. A method as claimed in claim 12 wherein at least one of the nuts has the face thereof which is to be presented to its respective recess inclined outwardly so that the thickness of the nut at the periphery thereof is greater than the thickness of the nut adjacent the centre thereof.

* * * * *